(12) United States Patent
Nam

(10) Patent No.: US 7,766,234 B2
(45) Date of Patent: Aug. 3, 2010

(54) INFORMATION RECEIVING APPARATUS

(75) Inventor: Sang Ik Nam, Suwon (KR)

(73) Assignee: Bixolon Co., Ltd., Gyunggi-do (KR)

( * ) Notice: Subject to any disclaimer, the term of this patent is extended or adjusted under 35 U.S.C. 154(b) by 131 days.

(21) Appl. No.: 11/861,953

(22) Filed: Sep. 26, 2007

(65) Prior Publication Data
US 2008/0073433 A1    Mar. 27, 2008

(30) Foreign Application Priority Data
Sep. 27, 2006   (KR) .................. 10-2006-0094354

(51) Int. Cl.
*G06K 7/00* (2006.01)
(52) U.S. Cl. .................. 235/439; 235/483; 235/486; 312/276; 362/52; 361/679.02; 361/679.09
(58) Field of Classification Search .................. 235/439
See application file for complete search history.

(56) References Cited

U.S. PATENT DOCUMENTS 4,216,857 A   8/1980 Huang
4,870,604 A * 9/1989 Tatsuno .................. 361/679.09
4,986,618 A * 1/1991 Wakatsuki .................. 312/276
5,164,576 A   11/1992 Anglin et al.

FOREIGN PATENT DOCUMENTS

| EP | 0349210 | 6/1989 |
| EP | 0768613 | 10/1996 |
| FR | 4870604 | 11/1987 |

OTHER PUBLICATIONS

European search report for corresponding application No. EP 07117239 completed Jul. 30, 2008.

* cited by examiner

*Primary Examiner*—Karl D Frech
*Assistant Examiner*—Tae Kim
(74) *Attorney, Agent, or Firm*—Renner, Otto, Boisselle & Sklar, LLP

(57) ABSTRACT

An information receiving apparatus including: a reader receiving information stored in an information storage medium; and a body processing the information received by the reader, wherein the reader is assembled with the body in such a way that a insertion portion 212 in contact with the information storage medium is capable of being exposed to the outside and hidden in the inside of the body.

17 Claims, 10 Drawing Sheets

INFORMATION RECEIVING APPARATUS

CROSS-REFERENCE TO RELATED APPLICATIONS

This application claims the priority of Korean Patent Application No. 2006-94354 filed on Sep. 27, 2006, in the Korean Intellectual Property Office, the disclosure of which is incorporated herein by reference.

BACKGROUND OF THE INVENTION

1. Field of the Invention

The present invention relates to an information receiving apparatus capable of reading information stored in an information storage medium such as a magnetic strip of a credit card, and more particularly, to an information receiving apparatus having a reader in contact with an information storage medium and reading information therefrom, the reader capable of moving inside and outside a body of the apparatus.

2. Description of the Related Art

Together with a development of communication means, the frequency of paying with a credit card is gradually increased, which makes all kinds of information receiving apparatuses for receiving information stored in a magnetic strip of a credit card be developed.

Also, recently, there has been provided a portable multi-terminal capable of not only simply receiving information but also transmitting the received information and outputting all kinds of information related thereto, the multi-terminal manufactured with a size and structure to be portable not to have a spatial restriction.

FIGS. 1 and 2 are a perspective view and a side cross-sectional view illustrating the conventional portable multi-terminal.

As shown in FIGS. 1 and 2, the conventional portable multi-terminal includes a personal digital assistant (PDA) 30 for inputting information written by hand, managing personal information, and interchanging information with a computer; a printer body 80 where a mounting area 51 is formed to interchange data with the PDA when the PDA is mounted thereon; a printer module 60 installed in the printer body 80 to print data displayed on the PDA 30 on a paper 11; a magnetic stripe reader (MSR) 92 installed to a portion projected toward a side of the printer body 80 and reading user information stored in a magnetic strip to allow payment with a credit card when the credit card is slid; a smart card reader 94 installed in the printer body 80 to interchange data with a smart card and perform payment with the smart card; and a barcode reader 96 installed in the one side of the printer body 80, reading a printed barcode on a product, and displaying a price of the product on the PDA 30.

In this case, the printer body 80 includes an upper case 50 where a mounting unit 51 for electrically connecting the printer module 60, the MSR 92, the smart card reader 94, and the barcode reader 96 to the mounted PDA 30 and a lower case 70 assembled with a bottom of the upper case 50 having a battery container 71 where a battery 10 is inserted, formed on one side of the lower case 70, and having a paper container 73 containing a roll of paper required to print data of the PDA 30 thereon, formed on another side of the lower case 70.

The upper case 50 has the mounting unit 51 with a pair of hooks 52 upwardly projected from both ends of a top surface thereof and has a connecting hole unit 53 to allow an assemble end of the PDA 30 to be in contact with the one side end of the mounting unit 51 to be electrically connected.

In addition, a printed circuit board (PCB) 54 is installed on an inner side of the connecting hole unit 53, the PCB 54 provides data transmitted from the PDA 30 to respective required devices, provides information inputted from the MSR 92, the smart card reader 94, and the barcode reader 96 to the PDA 30, and forms a controller controlling the printer module 60.

The battery container 71 is formed on one side of the lower case 70 and the paper container 73 is formed on another side of the lower case 70 in such a way that a battery cover 72 and a paper cover 74 are detachably installed. On a lower side end, a guide 75 is formed to allow a credit card to be slid while closely attached to the lower case 70.

In this case, the battery container 71 is formed of a panel curved inwardly to form a square, and the paper container 73 includes a storage 73a bulged upwardly to store the roll of the paper 11 and a guider 73b formed by one end of the storage 73a extended toward a discharge slit 76 in such a way that the paper is slid along a bottom surface of the guider 73b to be discharged and the printer module 60 and the barcode reader 96 are safely installed on a top surface as shown in FIG. 5.

The paper cover 74 is installed to be capable of sliding in a side direction of the lower case 70 in such a way that an end corresponding to the discharge slit 76 is curved upwardly to form a side surface of the lower case, in which a pair of supporters 74a are installed to rotate a discharge roller 65 of the printer module 60 to externally discharge the paper 11 via the discharge slit 76, and, when the paper cover 74 is detached from the lower case 70 to be slid toward the side, the discharge roller 65 is also detached from the printer module 60, thereby easily drawing the paper 11 discharged between the discharge roller 65 and the printer module 60.

The guide 75 forms a predetermined space together with the bottom surface of the lower case 70, in which the MSR 92 is installed to allow payment with a credit card to be performed by sensing user information stored in a magnetic strip when a user slides the magnetic strip of the credit card along the space.

However, in the conventional portable multi-terminal, since a space between the lower case 70 and the guide 75 is always exposed, a projected portion of the MSR 92 to read information stored in a magnetic strip of a credit card, which is exposed to the space, is polluted due to dusts. Therefore, information is not capable of being normally read.

Also, when water or drink flows into the space between the lower case 70 and the guide 75, the multi-terminal may get electrically damaged.

SUMMARY OF THE INVENTION

An aspect of the present invention provides an information receiving apparatus formed in such a way that an insertion portion in contact with an information storage medium to read information therefrom is capable of being exposed to the outside of a body and hidden in the body depending on a selection of a user.

According to an aspect of the present invention, there is provided an information receiving apparatus including: a reader receiving information stored in an information storage medium; and a body processing the information received by the reader, wherein the reader is assembled with the body in such a way that an insertion portion in contact with the information storage medium is capable of being exposed to the outside and hidden in the inside of the body.

The reader may include a hook hung on a portion of the body when the insertion portion is hidden, and the body comprises a lock release button to release the hook from a lock.

The reader may be formed in such a way that the insertion portion is extended to the outside of the body when the reader is pushed toward the inside of the body while the insertion portion is hidden in the body and the insertion portion is retracted into the body when the reader is pushed toward the inside of the body while the insertion portion is extended to the outside of the body.

The reader may include a guide projection extruded toward the body in a direction crossing a direction of extension and retraction, and the body comprises a guide groove including: a first fastening area where the guide projection is fastened in when the insertion portion is retracted into the body; and a second fastening area the guide projection is fastened in when the insertion portion is extended to the outside of the body, wherein the first and second fastening areas are formed in a groove shape to guide a transfer path of the guide projection.

The apparatus may further include an elastic member applying an elastic force to the reader to be extended to the outside of the body.

The reader may be assembled with the body to be rotatable.

The reader may be assembled with the body by a hinge coupled with an opposite side of a side where an entrance of the insertion portion is formed.

The reader may be assembled with the body to be capable of being slid.

The reader may include: a bracket that is an insertion portion where the information storage medium is inserted; and a reading portion assembled with the bracket to be totally or partially exposed to the insertion portion and reading the information stored in the information storage medium.

The insertion portion may be formed in the shape of a slit allowing a credit card to pass therethrough.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
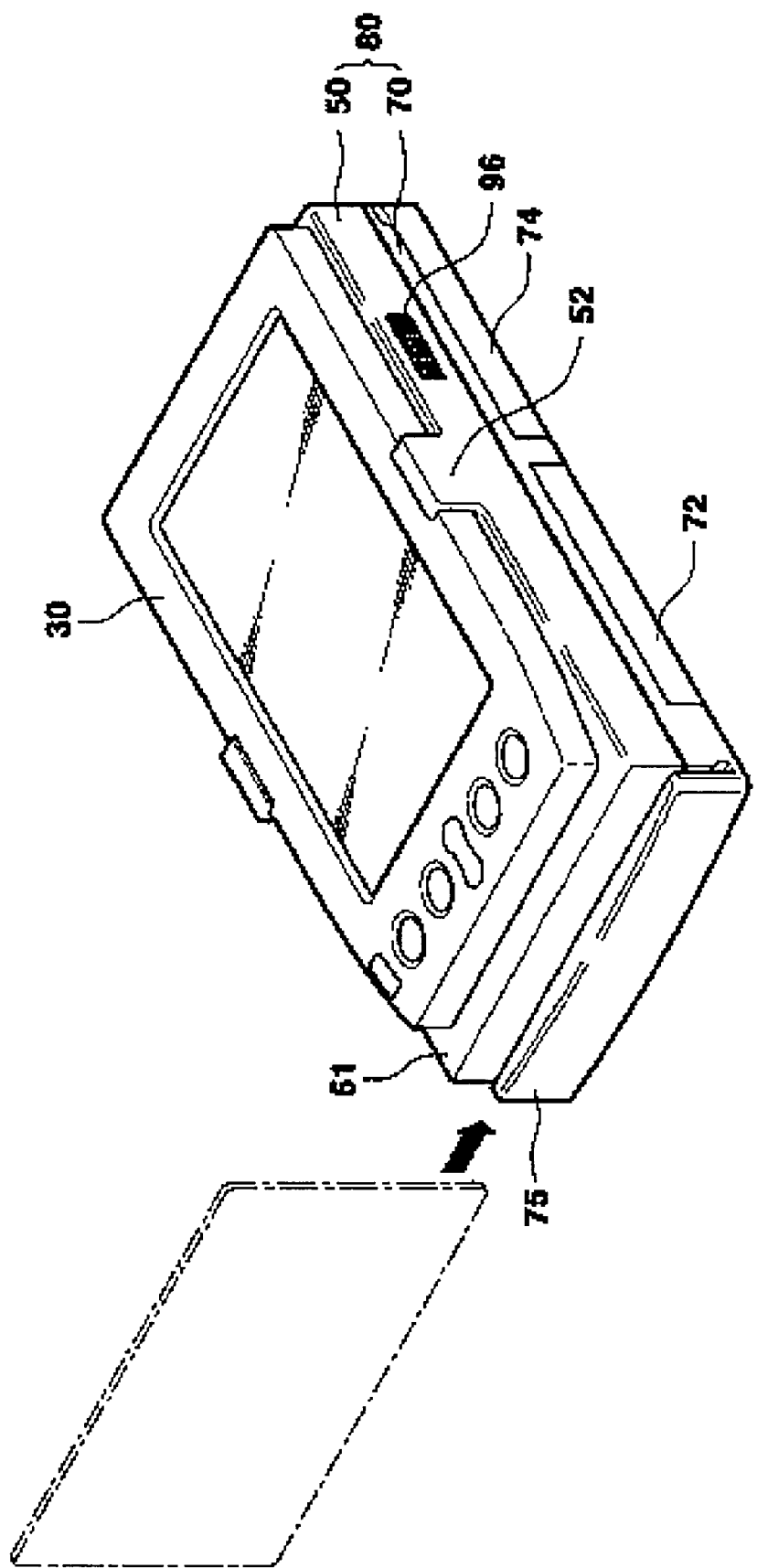
FIG. 1 is a perspective view illustrating a conventional portable multi-terminal.
Figure 2:
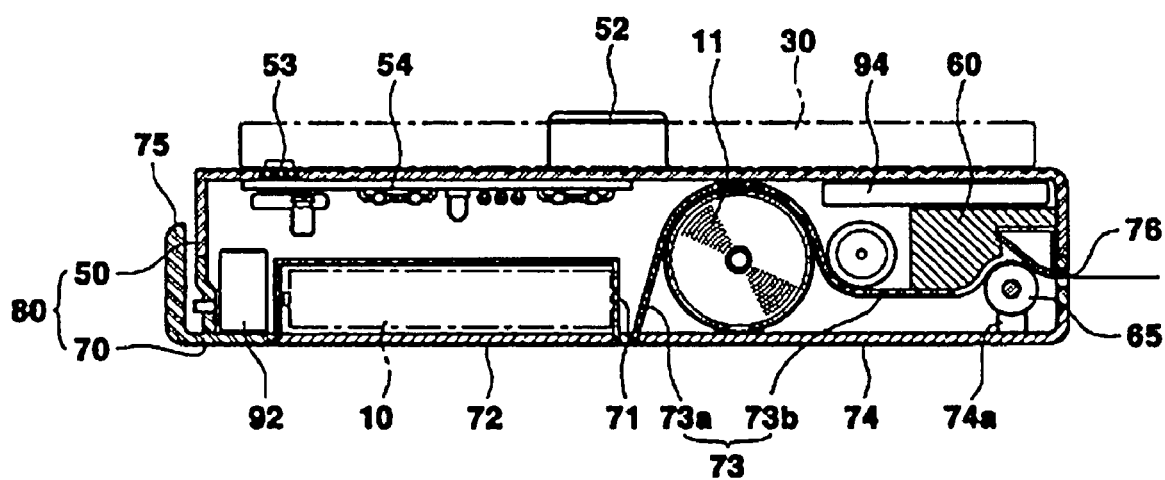
FIG. 2 is a side cross-sectional view illustrating the conventional portable multi-terminal of FIG. 1.
Figure 3:
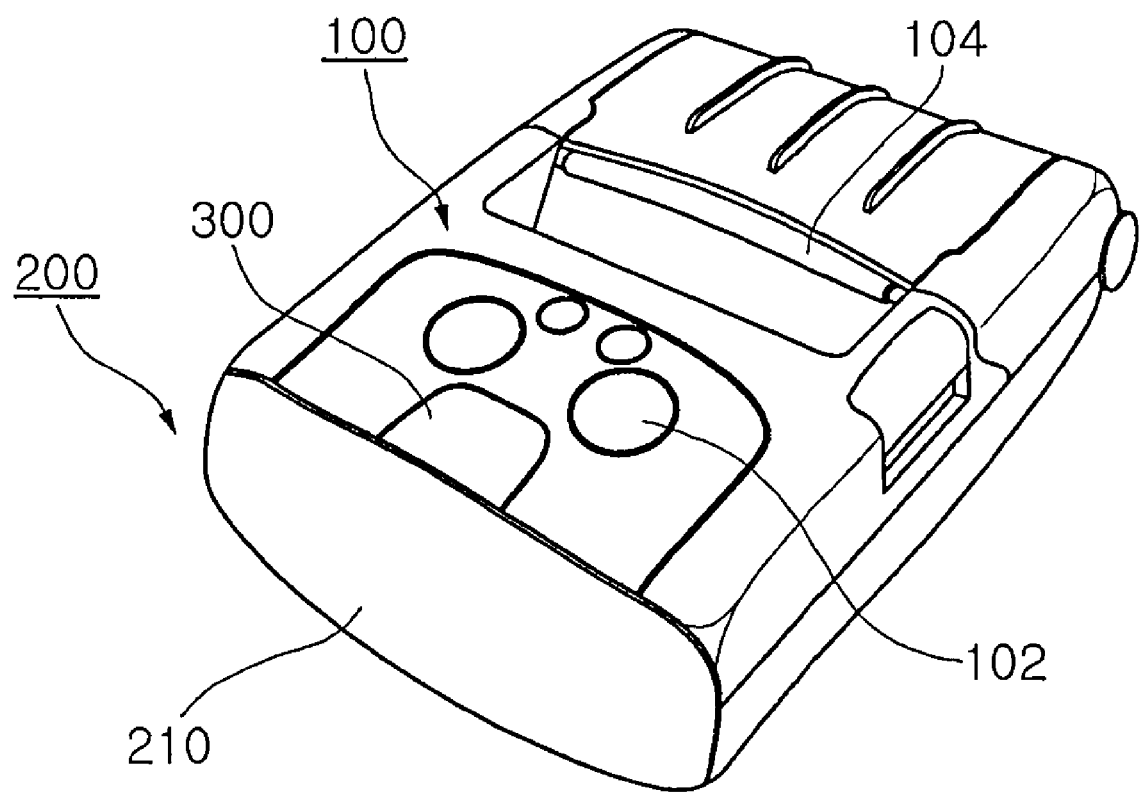
FIGS. 3 and 4 are perspective views illustrating an information receiving apparatus according to an embodiment of the present invention.
Figure 4:
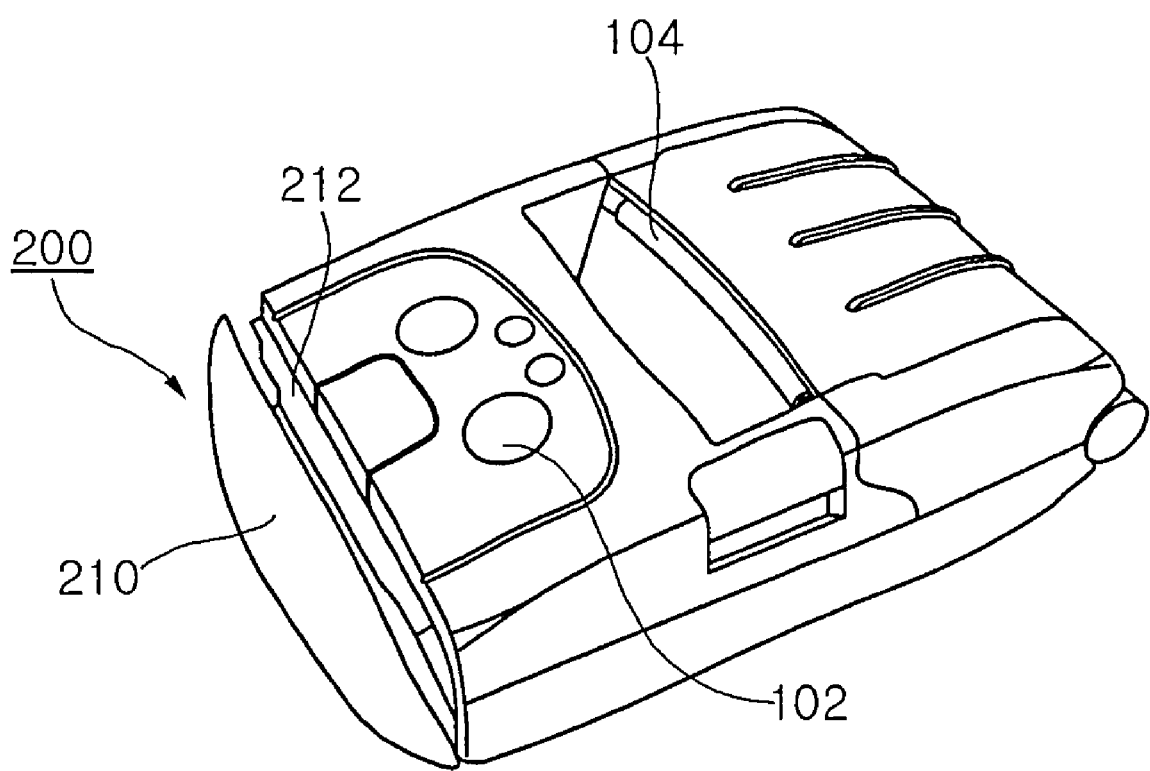
Figure 5:
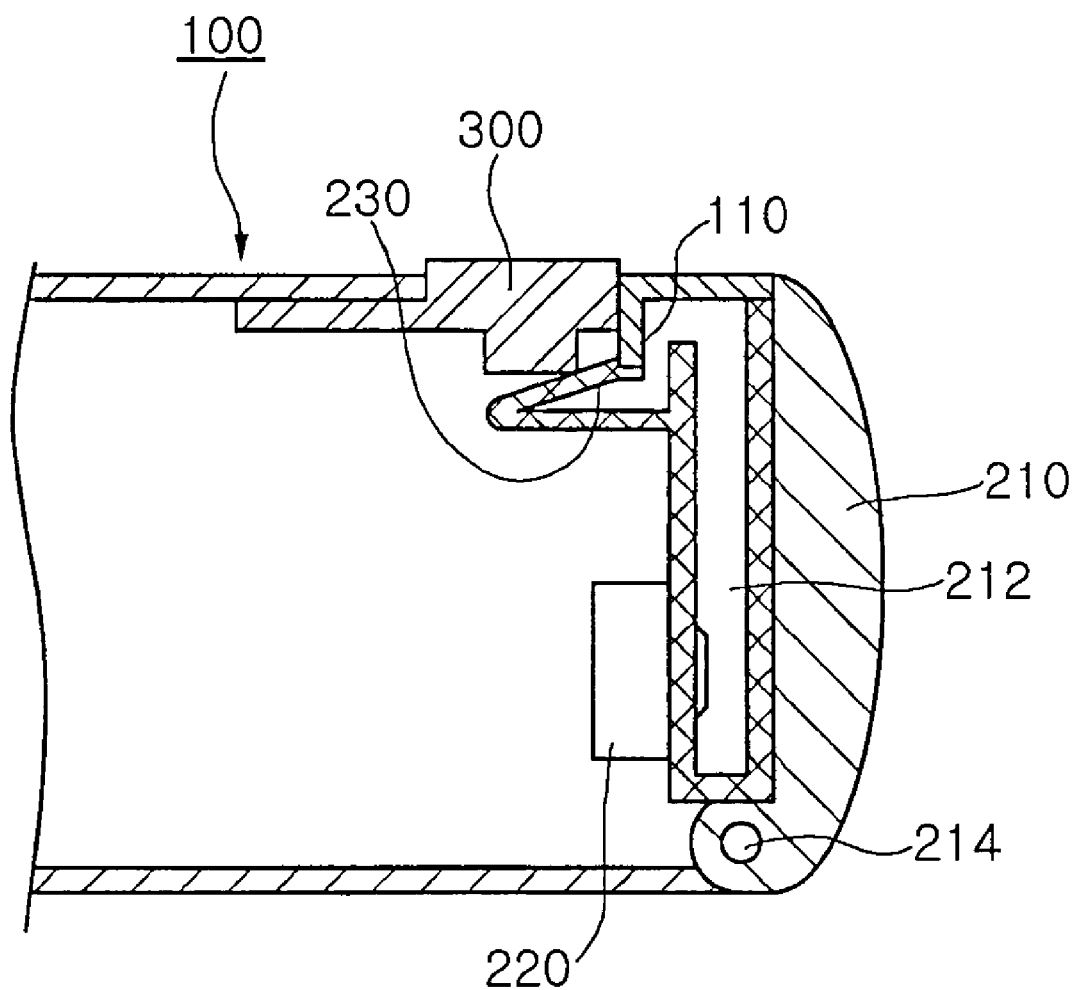
FIGS. 5 and 6 are cross-sectional views illustrating the information receiving apparatus of FIG. 3.
Figure 6:
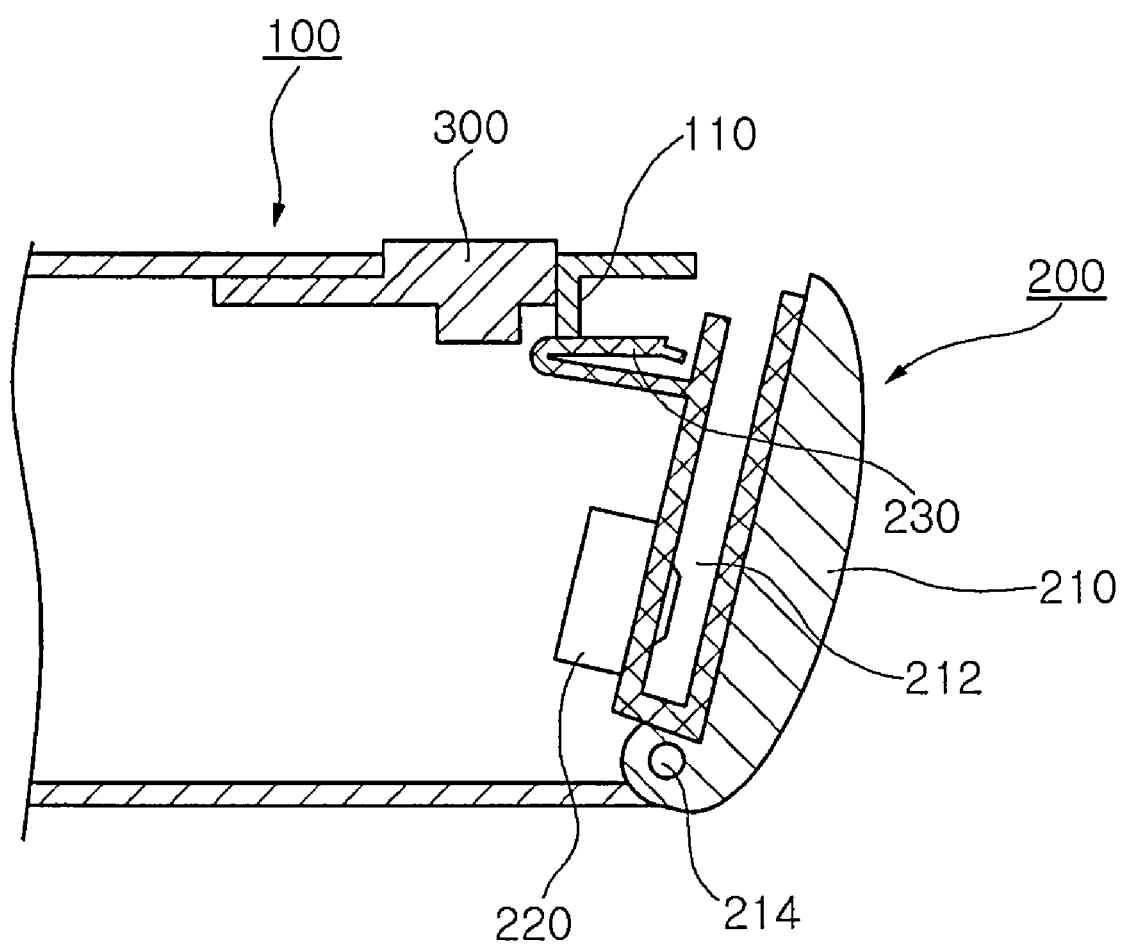

FIGS. 3 and 4 are perspective views illustrating an information receiving apparatus according to an embodiment of the present invention, and FIGS. 5 and 6 are cross-sectional views illustrating the information receiving apparatus of FIG. 3.

Referring to FIGS. 3 and 4, the information receiving apparatus includes a body 100 formed to process information received from the outside, that is, to operate, output, and transmit the received information and a reader 200 receiving information stored in an information storage medium such as a credit card including a magnetic strip, which is in contact with the reader 200, and transmitting the information to the body 100.

The body 100 includes a plurality of operation buttons 102 to allow a user to order an operation or directly input information and an output portion 104 outputting a status and result of processing the received information on a paper. In this case, since the described operation buttons 102 and the output portion 104 have been applied to conventional portable multi-terminals, detailed description thereof will be omitted.

In the reader 200, an insertion portion 212 capable of being in contact with the information storage medium is formed and a reading portion 220 such as a magnetic strip reader (MSR) is mounted to read information stored in a magnetic strip of a credit card passing through the insertion portion 212. In the present embodiment, though the insertion portion 212 is formed in the shape of a slit to read the information stored in the magnetic strip of the credit card, the insertion portion 212 may be modified variously with the kind of the information storage medium.

In this case, a feature of the present invention is that the insertion portion 212 is extended to the outside of the body 100 as shown in FIG. 4 when using the reading portion 220, that is, the information storage medium is inserted into the insertion portion 212, thereby preventing pollution and damage of the reading portion 220. Therefore, a structure in which the insertion portion 212 is extended to the outside and retracted into the body 100 will be described in detail.

A bottom end of the reader 200 is assembled with the body 100 by a hinge 214 to allow the insertion portion 212 to be extended to the outside and retracted into the body 100. The body 100 includes a sill 110 formed therein, and the reader 200 includes a hook hung on the sill 110 when the insertion portion 212 is located to be retracted into the body 100.

The information receiving apparatus includes an elastic member applying an elastic force to the reader 200 in a direction where the insertion portion 212 is extended to the outside of the body 100. The elastic member may be, but not limited to, various kinds of springs such as a pin spring and a coil spring, which can be replaced by an element capable of applying the elastic force to the reader 200.

Since the hook 230 is formed in a structure having elasticity to be detachable from the sill 110, that is, to be closely attached to the sill 110, though the elastic force is applied from the elastic member, a lock between the hook 230 and the sill 110 is not released when there is no additional external force. Accordingly, the insertion portion 212 is maintained to be retracted into the body 100.

In this case, to release the lock between the hook 230 and the sill 110, the body 100 includes a lock release button 300 pressurizes the hook 230. Accordingly, as shown in FIG. 5, when the user pushes the lock release button 300 while the insertion portion 212 is hidden in the body 100, the hook 230 is pushed downwardly and released from the sill 110 and the reader 200 is pivoted about the hinge 214 by the elastic force of the elastic member as shown in FIG. 6.

The user may transfer the information stored in the magnetic slit of the credit card to the reading portion 220 by putting the credit card into the insertion portion 212 to be slid while the insertion portion 212 is exposed.

In the present embodiment, to easily understand the configuration of the present invention, structures of the hook 230 and the sill 110 are very simple and brief. However, the structures of the hook 230 and the sill 110 may be modified as being various to improve a fastening force between the body 100 and the reader 200 and durability.

Figure 7:
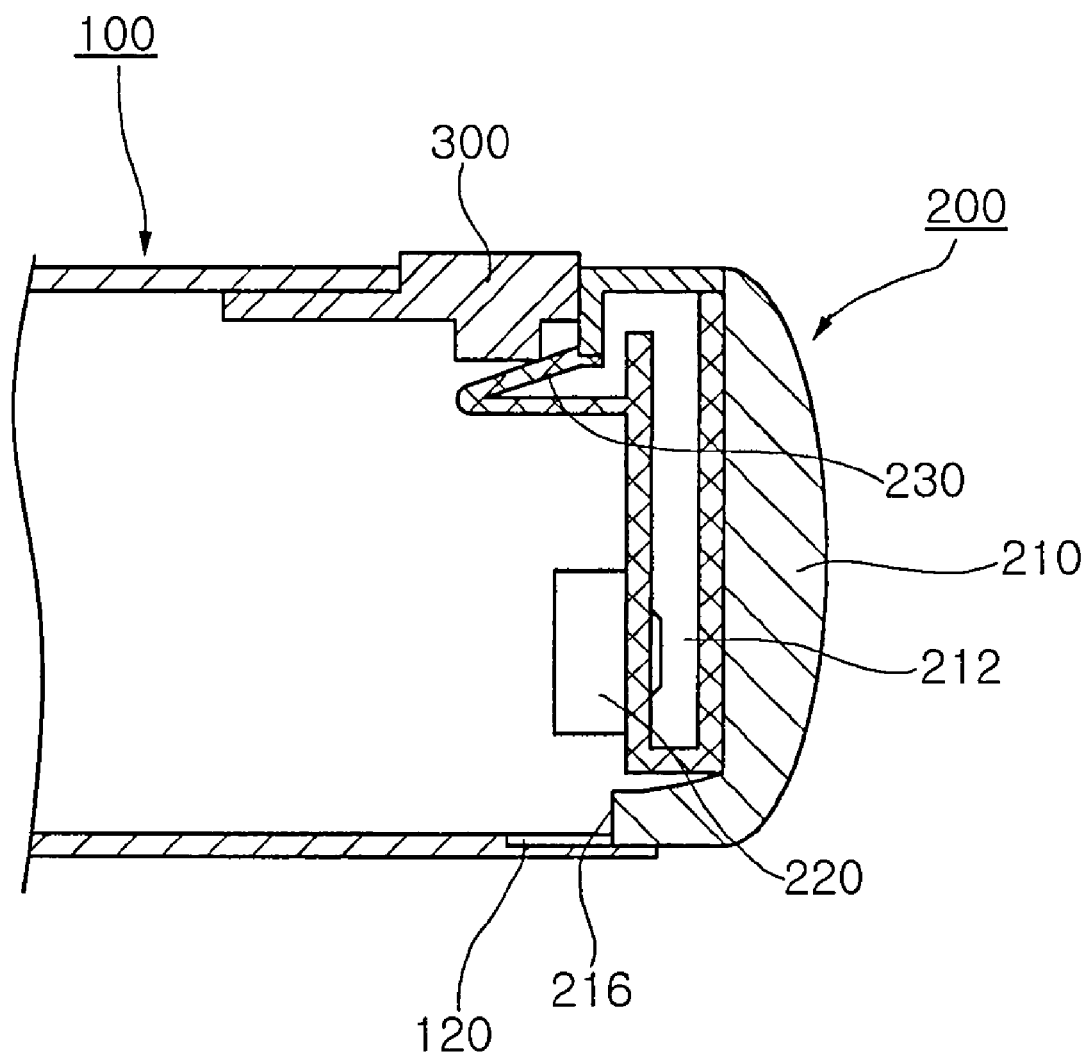
FIG. 7 is a cross-sectional view illustrating an information receiving apparatus according to another embodiment of the present invention.

FIG. 7 is a cross-sectional view illustrating an information receiving apparatus according to another embodiment of the present invention.

As shown in FIGS. 3 through 6, the information receiving apparatus may be formed in such a way that the insertion portion 212 is exposed by a rotation of the reader 200 or by a sliding of the reader 200.

To slide the reader 200 as described above, the body 100 has one or more slide grooves 120. And the slide groove 120 is formed to have a length in a transfer direction of the reader 200, for example, horizontally extended. Also, a slide projection 216 slid along the slide groove 120 is formed on the reader 200. In this case, similar to the embodiment of FIGS. 3 through 6, there is included an elastic member applying an elastic force to the reader 200 in a direction where the insertion portion 212 is extended to the outside of the body 100.

Since the structure in which a location of the reader 200 is fixed by hanging the hook 230 on the sill 110 and a lock between the hook 230 and the sill 110 is released by pushing the lock release button 300 is identical to that of the embodiment of FIGS. 3 through 6, a detailed description thereof will be omitted.

In a state shown in FIG. 7, when the user pushes the lock release button 300, the hook 230 is released from the sill 110 and the reader 200 is slid by the elastic force of the elastic member in such a way that the insertion portion 212 is extended to the outside of the body 100.

When the reader 200 is formed to rotate, the insertion portion 212 is inclined to one side when being extended to the outside of the body 100. However, when the reader 200 is formed to be slid in a horizontal direction as shown in FIG. 7, since the insertion portion 212 is always maintained to be perpendicular, it becomes convenient to use the information receiving apparatus.

Figure 8:
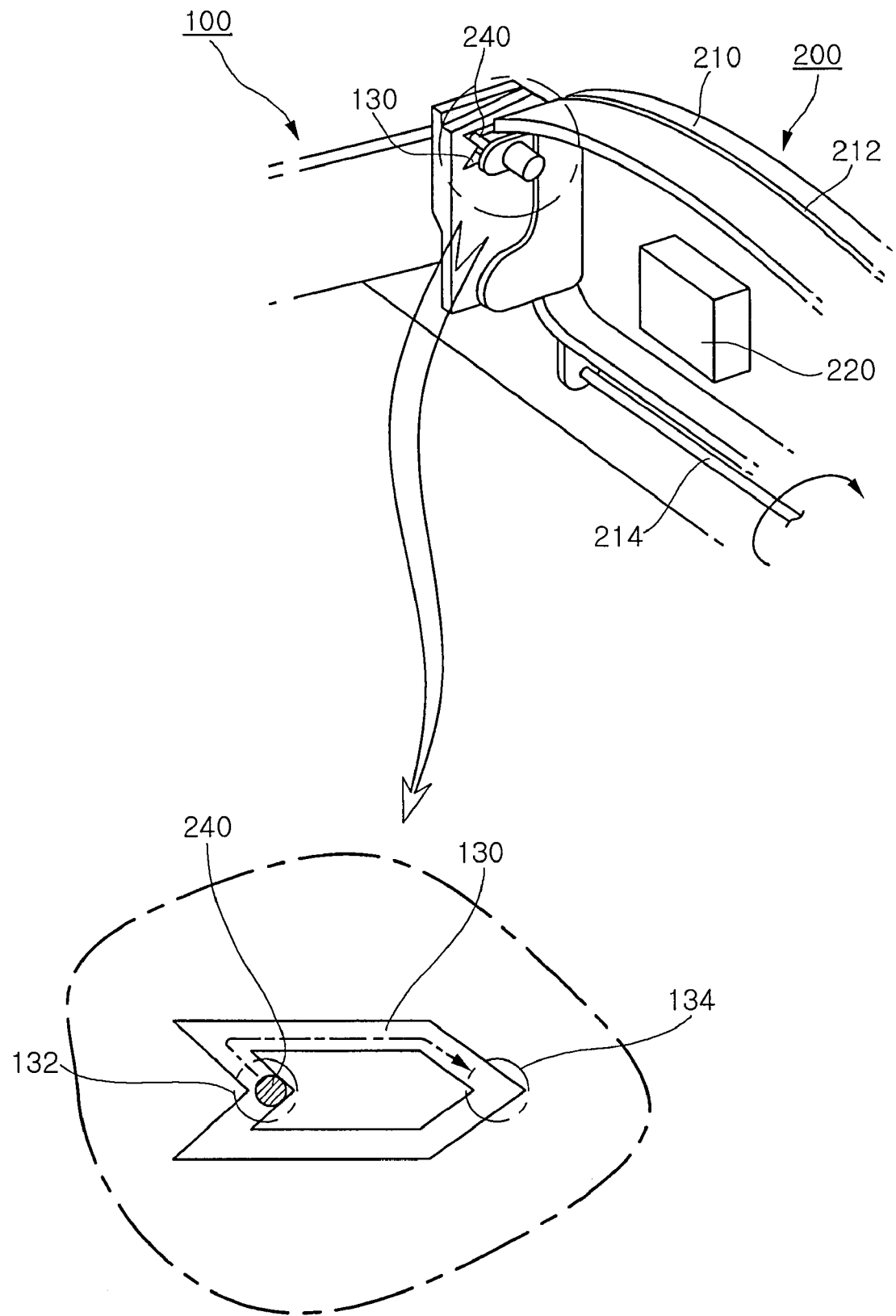
FIGS. 8 and 9 are partial views illustrating an internal configuration of an information receiving apparatus according to still another embodiment of the present invention.
Figure 9:
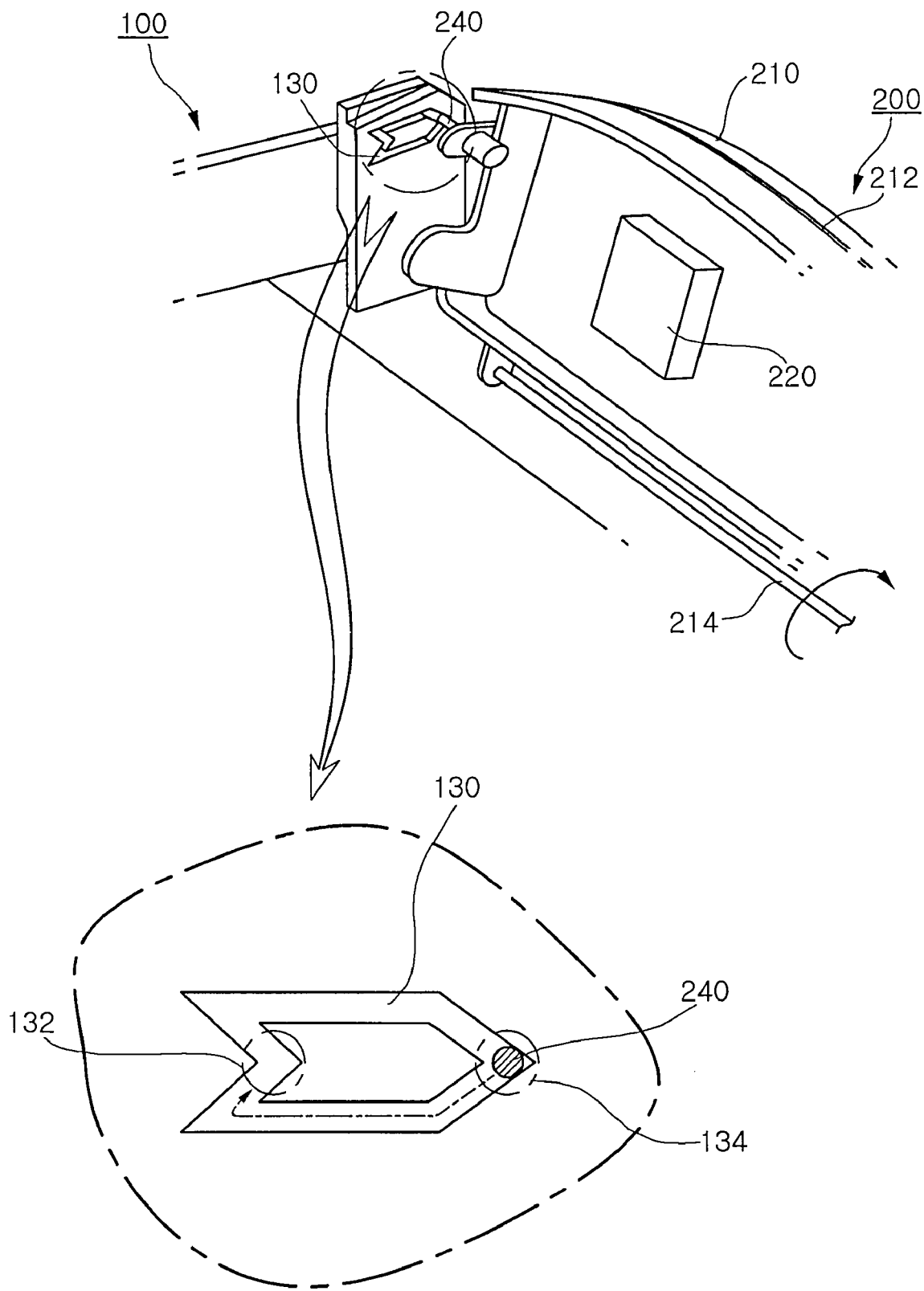
Figure 10:
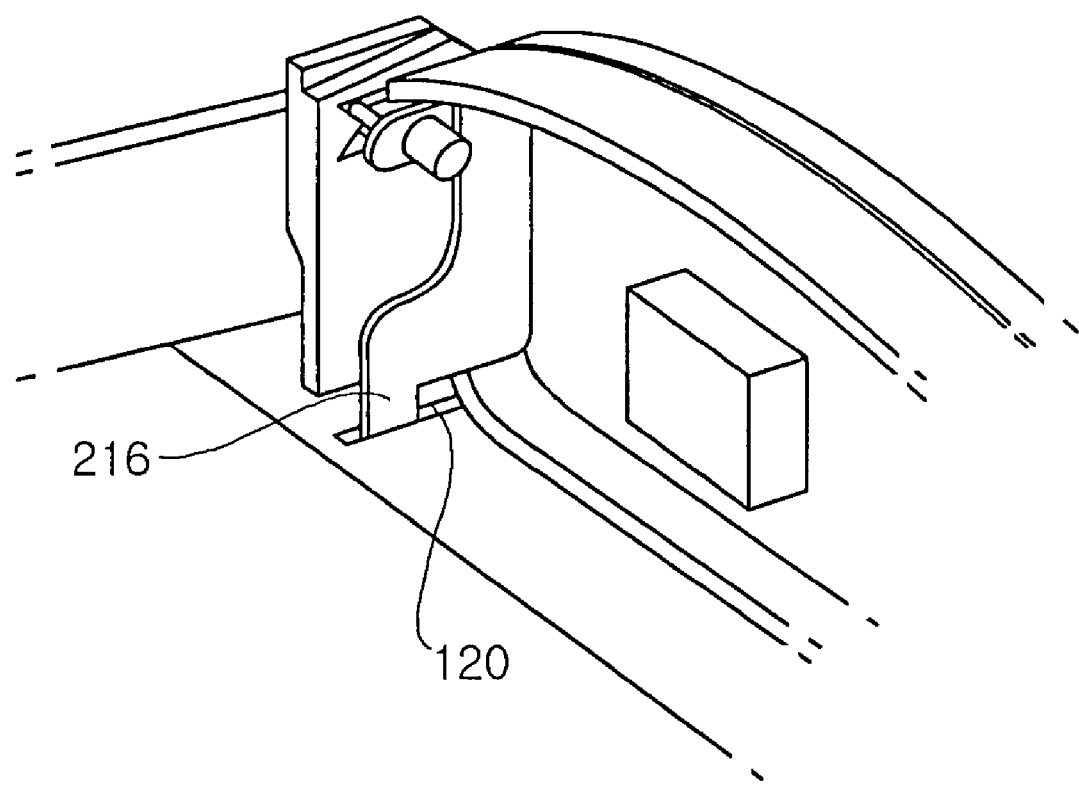
FIG. 10 is a partial view illustrating an internal configuration of an information receiving apparatus according to a further embodiment of the present invention.

FIGS. 8 and 9 are partial views illustrating an internal configuration of an information receiving apparatus according to still another embodiment of the present invention, and FIG. 10 is a partial view illustrating an internal configuration of an information receiving apparatus according to a further embodiment of the present invention.

The information receiving apparatus may be formed in such a way that a location of the reader 200 is fixed by a lock and release between the hook 230 and the sill 110 or is fixed by a toggle type. That is, the reader 200 may be assembled with the body 100 in such a way that the insertion portion 212 is extended to the outside of the body 100 when the reader 200 is pushed toward the inside of the body 100 while the insertion portion 212 is retracted into the body 100 and the insertion portion 212 is retracted into the body 100 when the reader 200 is pushed toward the inside of the body 100 while the insertion portion 212 is extended to the outside of the body 100.

To fix a location of the reader 200 by using the toggle type, the reader 200 includes a guide projection 240 projected toward the body 100 in a direction crossing a direction of a retraction and extension of the insertion portion 212 and the body 100 includes a guide groove 130 guiding a transfer path of the guide projection 240 simultaneously with fixing a location of the guide projection 240. The guide groove 130 includes a first fastening area 132 where the guide projection 240 is fastened when the insertion portion 212 is retracted into the body 100 and a second fastening area 134 where the guide projection 240 is fastened when the insertion portion 212 is extended to the outside of the body 100.

Accordingly, in a state as shown in FIG. 8, when the user pushes the reader 200 toward the inside of the body 100, the guide projection 240 is moved along an arrow shown in FIG. 8 to the second fastening area 134 and the insertion portion 212 is exposed as shown in FIG. 9. In a state shown in FIG. 9, when the user pushes the reader 200 toward the inside of the body 100, the guide projection 240 is moved along an arrow shown in FIG. 9 to the first fastening area 132 and the insertion portion 212 is retracted into the body 100 as shown in FIG. 8.

In the present embodiment, the guide 130 is formed in the shape of a closed curve. However, the guide groove 130 is not limited to the shape of the present embodiment and may be changed into any shape capable of fastening the insertion portion 212 at two locations departed from each other in a horizontal direction, that is, in the retraction and extension directions.

Also, when the reader 200 is operated by the toggle type as described above, the reader 200 may be formed to be pivoted about the hinge 214 as shown in FIGS. 8 and 9 or may be formed to be slid along the slide groove 120 as shown in FIG. 10. Since the structure of the reader 200 is identical to the embodiments shown in FIGS. 3 through 7, a detailed description thereof will be omitted.

As illustrated in FIGS. 3 through 7, when the reader 200 is formed to be pivoted or be slid by pushing the lock release button 300, it may be complicated to use both hands since the body 100 is gripped by one hand and the lock release button 300 is pushed by another hand to pivot or slide the reader 200. However, as in the present embodiment, when the reader 200 is formed to be operated by a toggle, the user may grip the body 100 by one hand and may pivot or slide the reader 200 by allowing the reader 200 to be in contact with a portion of a human body or another object.

According to an aspect of the present invention, there is provided an information receiving apparatus having a insertion portion, which is in contact with an information storage medium to read information stored therein, the insertion portion capable of being extended to the outside of a body and retracted into the body depending on a selection of a user, thereby preventing pollution or damage of the insertion portion and a reader built therein.

The features, structures, and other characteristics of the exemplary embodiments described herein may be combined in various ways to obtain additional and/or alternative exemplary embodiments.

While the present invention has been shown and described in connection with the exemplary embodiments, it will be apparent to those skilled in the art that modifications and variations can be made without departing from the spirit and scope of the invention as defined by the appended claims.

What is claimed is:

1. An information receiving apparatus comprising:
a reader for receiving information stored in an information storage medium having a magnetic strip; and
a body including electronics for processing the information received by the reader;
wherein the reader comprises:
a bracket assembled with the body to be rotatable, an insertion portion provided to the bracket in the shape of a slit allowing the magnetic strip of the information storage medium to pass therethrough, and a reading portion provided on the insertion portion to be totally or partially exposed to the insertion portion for reading information from the magnetic strip of the information storage medium, and wherein the insertion portion is capable of being exposed to the outside and hidden in the inside of the body by the rotation of the bracket.

2. The apparatus of claim 1, wherein the reader comprises a hook hung on a portion of the body when the insertion portion is hidden in the inside of the body, and the body comprises a lock release button to release the hook from a lock.

3. The apparatus of claim 1, wherein the reader is formed in such a way that the insertion portion is exposed to the outside of the body when the reader is pushed toward the inside of the body while the insertion portion is hidden in the body and the insertion portion is hidden in the body when the reader is pushed toward the inside of the body while the insertion portion is exposed to the outside of the body.

4. The apparatus of claim 3, wherein the reader comprises a guide projection toward the body in a direction crossing a direction of exposure and hiding, and the body comprises a guide groove comprising:
   a first fastening area where the guide projection is fastened in when the insertion portion is hidden in the body; and
   a second fastening area the guide projection is fastened in when the insertion portion is exposed to the outside of the body,
   wherein the first and second fastening areas are formed in a groove shape to guide a transfer path of the guide projection.

5. The apparatus of claim 1, further comprising an elastic member applying an elastic force to the reader to be exposed to the outside of the body.

6. The apparatus of claim 1, wherein the reader is assembled with the body to be capable of being slid.

7. The apparatus of claim 1, wherein the information storage medium is a credit card.

8. An information receiving apparatus comprising a body and a reader mounted to the body for movement between an extended position and a retracted position, the reader including a card reading slot for receiving a card having a magnetic strip containing information, and a reading portion exposed to the slot for reading from the magnetic strip information contained thereon as the magnetic strip passes by the reading portion during movement of the card in the slot, and wherein when the reader is in its extended position, the card reading slot is exposed to the outside of the body for allowing the card having a magnetic strip to be moved in the slot for reading of information from the magnetic strip by the reading portion of the reader, and wherein when the reader is in its retracted position, the card reading slot is hidden inside the body thereby to protect the reading portion of the reader from external contamination.

9. The apparatus of claim 8, comprising a releasable hook for retaining the reader in its retracted position, and a manually depressible release button for releasing the hook to allow the reader to move to its extended position.

10. The apparatus of claim 8, comprising a lock and release mechanism configured such that the reader is released from the retracted position for movement to its extended position by pushing the reader from the retracted position toward the body, and is locked in the retracted position by pushing the reader from the extended position toward the body beyond the retracted position.

11. The apparatus of claim 10, wherein the reader is resiliently biased toward its extended position.

12. The apparatus of claim 9, wherein the reader is resiliently biased toward its extended position.

13. The apparatus of claim 8, wherein the reader is resiliently biased toward its extended position.

14. The apparatus of claim 8, wherein the reader is supported within the body for linear movement relative to the body.

15. The apparatus of claim 8, wherein the reader is pivotally mounted to the body for swinging movement between the extended and retracted position.

16. The apparatus of claim 8, wherein the body includes electronics connected to the reading portion for processing information received from the magnetic strip.

17. The apparatus of claim 8, wherein the apparatus is a portable multi-terminal device including on the body a plurality of operation buttons.

* * * * *